April 15, 1952 R. E. BAUER 2,592,840
MEASURING GAUGE
Filed Oct. 30, 1944 2 SHEETS—SHEET 1

INVENTOR.
Russell E. Bauer.
BY
Harness, Dickey & Pierce.
ATTORNEYS.

April 15, 1952  R. E. BAUER  2,592,840
MEASURING GAUGE

Filed Oct. 30, 1944  2 SHEETS—SHEET 2

INVENTOR.
Russell E. Bauer.
BY
Harness, Dickey & Pierce.
ATTORNEYS.

Patented Apr. 15, 1952

2,592,840

UNITED STATES PATENT OFFICE 2,592,840

MEASURING GAUGE

Russell E. Bauer, Detroit, Mich.

Application October 30, 1944, Serial No. 560,976

2 Claims. (Cl. 33—172)

1

The present invention relates to measuring gages and particularly relates to improvements in a gage of the type disclosed in Bauer Patent No. 2,325,170.

One of the primary objects of the present invention is to eliminate the possibility of slight inaccuracies in the measurements by gages of the type above mentioned.

A further object of the invention is to provide improvements in the mounting of the measuring or indicating devices on stanchions, whereby the measuring devices may be swung about the axis of the stanchion so that the work-engaging member may be set above any place across the width of the anvil.

Another object of the invention is to provide an improved construction for compensating for any variation or inaccuracies that may be present in the lead of the micrometer screws employed in the gages of the present invention.

Other objects of the invention will become apparent from the following specification, the drawings relating thereto, and from the claims hereinafter set forth.

In the drawings, in which like numerals are used to designate like parts in the several views throughout:

Figure 1:
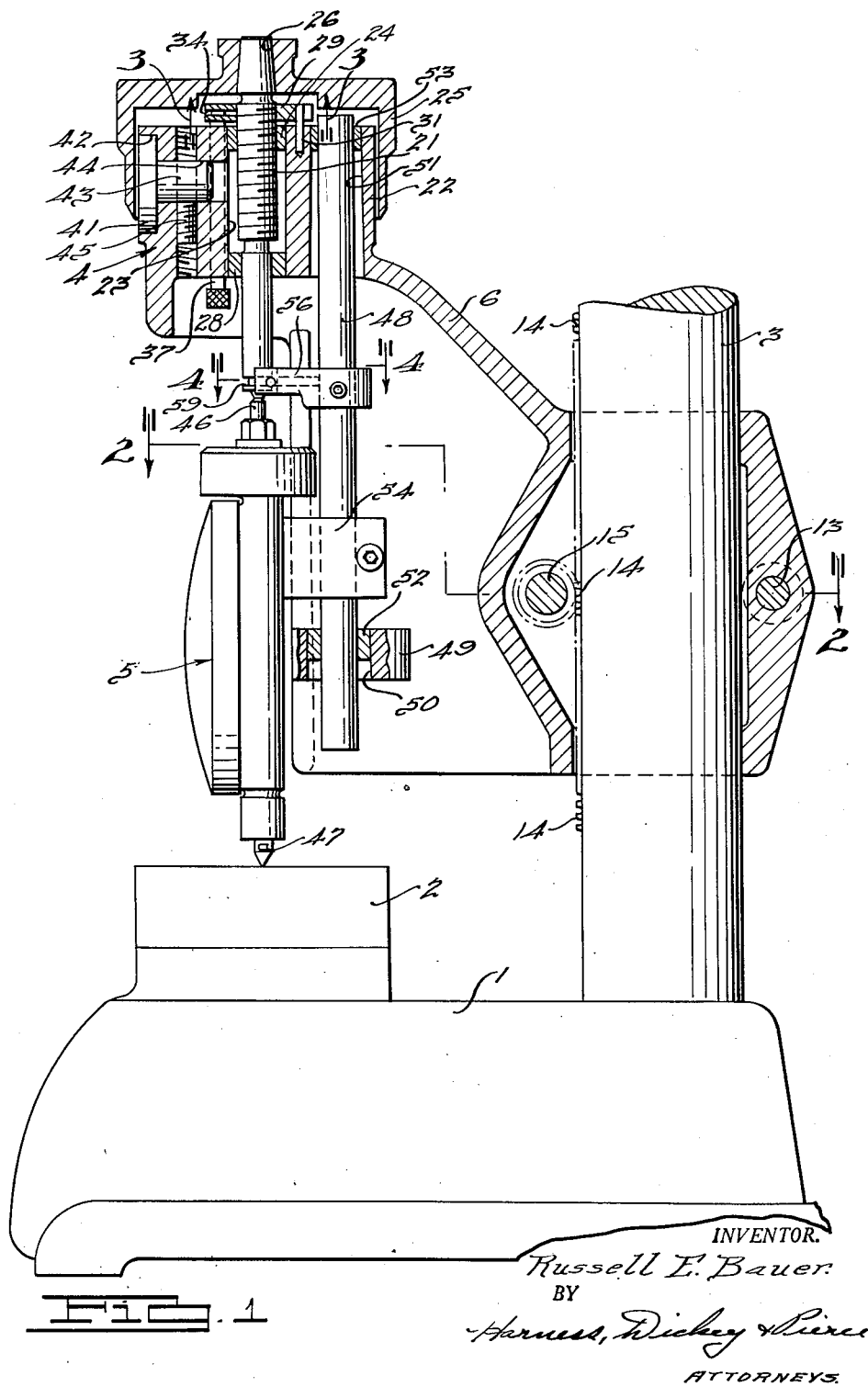
Figure 1 is a side elevational view, with parts in vertical section, of a measuring gage embodying features of the present invention.

In general, the measuring gage of the present invention includes a micrometer and a dial indicator combined in such a manner that after the micrometer is once set to a specified dimension of the workpieces produced, the difference between the specified dimension and the actual dimension of the workpiece may be directly read from the dial indicator. The micrometer spindle, the dial plunger, and the work-engaging member are all axially aligned so that movement of the work-engaging member is directly translated into movement of the dial indicator without the introduction of even slight error.

Referring to the drawings, the measuring gage

2 of the present invention comprises a base 1 having a horizontal work supporting anvil 2 fixedly supported thereon. A stanchion in the form of a vertical post 3 is mounted on the base 1, laterally offset from the anvil 2.

A micrometer generally indicated at 4 and a dial indicator generally indicated at 5 are mounted on a slide or carriage 6. The particular relationship of the micrometer and dial indicator and their mountings on the slide will be described in detail hereinafter.

To mount the slide 6 on the stanchion 3, the slide is constructed with a vertical, split clamp which embraces the stanchion 3 and which may be frictionally clamped thereon. To accomplish this, bosses 8 and 9 are formed on the carriage 6, and are provided with aligned openings 10 and 11 therethrough. Opening 10 is smooth and opening 11 is threaded for the reception of the threaded end 12 of a thumb screw 13. The thumb screw 13 is formed with an annular shoulder 14 which bears against the adjacent face of boss 8. By turning the screw 13 the split sections of the carriage 6 may be clamped or unclamped with respect to the stanchion 3.

The carriage 6 may be vertically adjusted and rotatively moved with respect to the vertical axis of stanchion 3 by means of an intermeshing rack 14 and pinion 15. The rack teeth 14 are formed along, or mounted on, the stanchion 3 and the pinion 15 is mounted on the carriage 6. The pinion 15 has a trunnion portion 16 at one end thereof which is received with a bearing portion 17 on carriage 6; and the opposite end of the pinion has a shaft 18 terminating in a thumb wheel 19. The shaft portion 18 is rotatably received within bearing opening 20 formed in the carriage 6.

Figure 2:
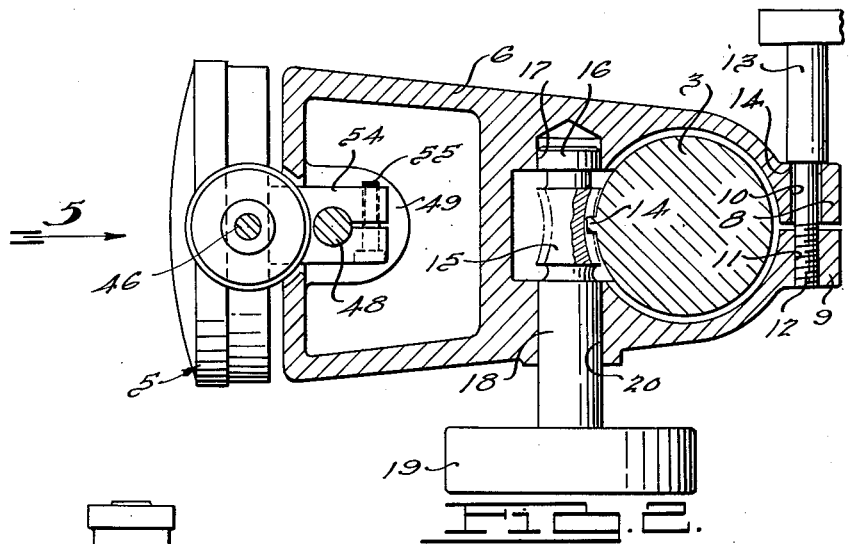
Fig. 2 is a cross-sectional view taken substantially along the line 2—2 of Fig. 1.
Figure 5:
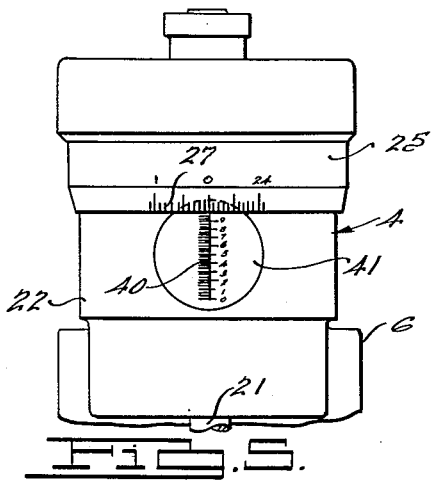
Fig. 5 is a partial, elevational view of the micrometer head of the present invention, taken in the direction of the arrow 5 of Fig. 2.

The pinion 15 is hourglass in form, as best shown in Fig. 2. The teeth of the pinion extend longitudinally thereof and lie in planes passing through the longitudinal axis of the pinion. The pinion teeth have longitudinal curvatures formed on a radius having as its center the longitudinal axis of the stanchion. The meshing tooth of the pinion is thus concentric with the periphery of the stanchion.

The teeth of pinion 15 are long, as compared to the width of the rack teeth, so that the pinion and rack will remain in mesh while the carriage may be rotated about the axis of the stanchion. Thus, the work engaging member of the gage may be swung about the stanchion to engage the workpiece at a number of points thereon.

As mentioned above, the micrometer 4 and the indicator 5 are mounted on the carriage 6 for movement therewith. The micrometer 4 comprises the usual spindle 21, which is vertically disposed and which has the usual fine threads formed thereon. The carriage 6 may be formed to provide the micrometer head 22 with a central vertical opening 23 through which the spindle 21 extends. A lead nut 24 is fixedly mounted within opening 23 adjacent the upper end thereof and threadably receives the threaded portion of spindle 21. A bearing sleeve 28 is fixedly mounted in the lower end of opening 23 and rotatably receives the smooth, depending end of the spindle 21 therethrough.

A thimble or cap 25 is secured to the upper end of spindle 21, through a tapered central opening 26, which receives the tapered upper end of the spindle therein. The head 22 is telescopically received within the cap 25 in the usual way. The cap 25 is tapered inwardly around the lower edge thereof to provide a surface upon which the scale 27 is marked around the periphery thereof.

Figure 3:
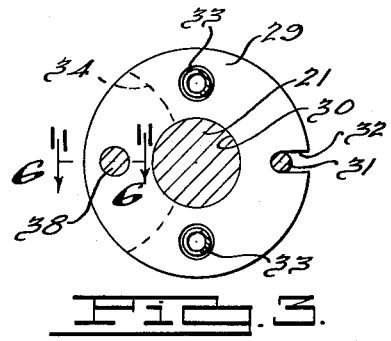
Fig. 3 is a cross-sectional view taken substantially along the line 3—3 of Fig. 1.
Figure 4:
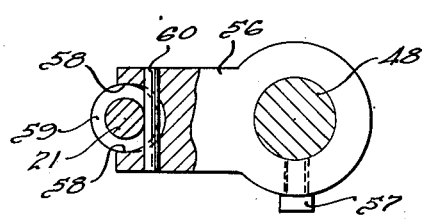
Fig. 4 is a cross-sectional view taken substantially along the line 4—4 of Fig. 1.
Figure 6:
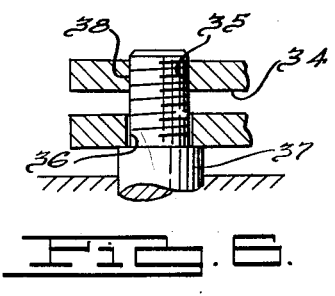
Fig. 6 is an enlarged cross-sectional view taken substantially along the line 6—6 of Fig. 3.

The spindle 21 may be locked in position by means best shown in Figs. 1, 3, and 6, which comprise a lock nut 29 having a central threaded opening 30 which threadably receives the spindle 21. The nut 29 is disposed on the top of head 22 and is held against rotative movement by means of a pin 31 which is mounted in an opening in head 22 and which projects upwardly within a notch 32 formed in the nut 29. Diametrically opposed coil springs 33 are disposed between the under surface of nut 29 and the adjacent top surface of head 22.

The nut 29 is slotted in a central plane as indicated at 34 so that the slot extends into opening 30. A pair of aligned openings 35 and 36 is formed through the slotted portions of the nut, the opening 35 being threaded and the opening 36 smooth. An elongated lock screw 37 extends upwardly through an opening in the head 22. The upper end of the screw 37 is reduced and threaded as indicated at 38. This forms a shoulder which abuts against the under surface of the nut (Fig. 6) with the threaded portion 38 received within the threaded opening 35. Thus by turning the screw 37 in one direction, the split sections of the nut are drawn together to bind the spindle to the lock nut 29. Turning the screw in the opposite direction releases the spindle.

The calibrations on the scale 27 successively register with a reference line 40 on head 22, the usual scale being indicated on the reference line 40. According to one feature of the present invention, the scale 40 is formed on a rotatable insert 41 which is received within a circular recess 42 in head 22. The insert has a central shank 43 which is rotatably received in opening 44 in the head. The insert may thus be rotated for adjustment about the axis of shank 43 and may be held in adjusted position by means of a setscrew 45.

The function of the adjustable scale 40 is to compensate for any inaccuracies in the lead of the micrometer screw or spindle. For a perfectly accurate lead screw the scale is positioned vertically and fixed in that position by the setscrew 45. However, if the lead screw is not accurate, compensation is made by rotating the insert to the extent indicated by a check of the particular screw and so fixing the insert to tilt the scale with respect to the vertical.

The calibrations on the scale 27 successively register with the scale line 40; and, in accordance with conventional practice, the scale readings are made to determine the extent of axial adjustment of micrometer spindle 21.

The dial indicator 5 is of conventional construction, being of the usual spring operated type, but is preferably designed and calibrated to amplify the reading representing the difference between the actual dimension of the workpiece and the specified dimension so that this difference may be quickly noted. The indicator includes the usual spring operated plunger 46 which is disposed on the top of the indicator housing and extends vertically upward. The plunger 46 is axially aligned with the axis of the spindle 21 and bears against the under surface thereof. The plunger 46 is actuated by movement of the indicator 5 toward the spindle 21 and causes rotation of the dial pointer in the usual way.

A depending work engaging member 47, which terminates in a tapered end, is fixed to the under side of the indicator housing and is on the axis of the spindle 21 so that it is also axially aligned with the axis of plunger 46.

The indicator 5 is mounted on the carriage 6 for movement therewith and also for limited movement with respect to the micrometer 4 axially of the micrometer spindle 21. The means for so mounting the indicator 5 includes a vertical rod 48 which is mounted on the carriage 6 for limited vertical movement on an axis parallel to the vertical axis of spindle 21. A boss 49 is formed integral with the front wall of carriage 6, and a tapered opening 50 is formed through the boss 49 and continues through the head 22 to form a tapered opening 51. The openings 50 and 51 are formed on the same taper.

Externally tapered bearing sleeves or bushings 52 and 53 are received within the tapered openings 50 and 51, respectively, and slidably receive the rod 48 therethrough. By having the holes 50 and 51 formed on the same, continuous taper and by using the tapered bushings, the holes are bound to be aligned when reamed so that the axis of the rod 48 is parallel to the axis of the spindle 21.

The indicator is adjustably fixed to the rod 48 for movement therewith by means of a split clamp 54 which has one end fixed to the back of the indicator housing with the opposite end embracing the rod 48 and clamped thereto by means of a screw 55. The clamp extends through a slot in the front wall of carriage 6.

The rod 48 is operatively connected with the spindle 21 for limited movement with respect thereto by means of a lost-motion connection. Such connection includes a laterally extending arm 56 which embraces the rod 48 and is fixed thereto by means of a screw 57 between the bushings 52 and 53. The free end of the arm 56 is bifurcated so that the inner, facing side walls 58 thereof slidably bear against diametrically opposite sides of the spindle adjacent the lower end thereof. An annular groove 59 is formed in the spindle 21 adjacent the lower end thereof. A transverse pin 60 of uniform circular cross-section is mounted in the arm 56 across the bight of the bifurcated end and is received within the groove 59. The width of the slot 59 exceeds the diameter of the pin 60 by a predetermined amount so that the rod, carrying the indicator 5 therewith, may slide vertically relative to the micrometer spindle.

The dial indicator 5 has a pointer (not shown) operatively connected with the plunger 46 in the usual way by a spring operated rack and pinion mechanism (not shown). The face of the dial is graduated to indicate fractions of an inch and the scale is numbered in both directions from the zero point in order to give both plus and minus readings.

In order to initially adjust the gage to check the desired workpieces, the dial indicator 5 is adjustably fixed on the rod 48 so that, with the micrometer set at the proper work-piece dimension to be checked, the dial pointer indicates .004 of an inch under zero when the work engaging member 47 is free from engagement with the workpiece. This enables the indicator 5 together with the rod 48 to move upwardly relative to the micrometer spindle .004 of an inch before the pointer on the dial indicates zero. If, for example, the width of the groove 59 allows .025 of an inch vertical movement of the dial indicator 5 relative to the micrometer spindle, the gage will then measure from .004 of an inch under size to .021 of an inch over size. These dimensions are illustrative and may be varied to suit various conditions.

In the use of the gage above described, assume that it is desired to measure a workpiece that is supposed to be exactly .250 of an inch thick, or in diameter. The micrometer 4 is first set at its zero position. The carriage 6 is then adjusted on the stanchion until member 47 engages the anvil 2 and the plunger 46 is depressed by the micrometer spindle to the extent required to move the dial pointer to the zero position. The carriage 6 is then clamped to the stanchion by screw 13. If the pointer does not move to the zero position the rim of the dial may be turned to that position.

The gage is then properly adjusted and the work engaging member 47 is in contact with the anvil 2. The micrometer cap 25 is then turned so that the micrometer reads .250 of an inch. The workpiece is then placed on the anvil 2 with the work engaging member 47 contacting the top of the workpiece. This causes the dial indicator 5 to move vertically with respect to the spindle, causing depression of the plunger 46 to actuate the dial pointer. If the pointer registers with the zero, the workpiece is the exact correct dimension. Under size or over size of the workpiece is directly indicated by the pointer position.

Formal changes may be made in the specific embodiment described without departing from the invention the scope of which is commensurate with the appended claims.

What is claimed is:

1. A measuring gage comprising a stanchion, a mounting member mounted on said stanchion, a micrometer mounted on said member, said micrometer including a depending, adjustable spindle, a dial indicator mounted on said member and having a plunger disposed below and engageable with said spindle, a depending work-engaging member attached to the indicator, said spindle and said plunger being axially aligned and said work-engaging member being disposed on the same axis, and means mounting said dial indicator on said member for limited vertical movement with respect to said member and said micrometer spindle, said last named means including a rod mounted on said member to one side of the axis of said spindle with the axis of the rod parallel to the axis of the spindle, means forming spaced, axially aligned, tapered openings in said member, said openings being formed on the same taper, tapered bushings disposed in said openings and slidably receiving said rod therein, and means connecting said dial indicator to said rod for movement therewith.

2. A micrometer gage comprising a tubular housing, a lead screw disposed within said housing, a lead nut mounted within said housing and threadably receiving said screw, a cap telescopically receiving said housing and connected to said screw for rotation therewith, a peripheral scale on said cap, an insert having a scale thereon, means mounting said insert on said housing for adjustable rotation to vary the angle of the insert scale with respect to the peripheral scale to compensate for inaccuracies in the lead screw.

RUSSELL E. BAUER.

REFERENCES CITED

The following references are of record in the file of this patent:

UNITED STATES PATENTS

| Number | Name | Date |
| --- | --- | --- |
| 1,386,899 | Samuel | Aug. 9, 1921 |
| 2,073,089 | Autenreith | Mar. 8, 1937 |
| 2,244,964 | Poock et al. | June 10, 1941 |
| 2,267,583 | Carroll | Dec. 23, 1941 |
| 2,287,273 | Rabb | June 23, 1942 |
| 2,307,323 | Laflamme | Jan. 5, 1943 |
| 2,325,170 | Bauer | July 27, 1943 |